Patented Feb. 27, 1951

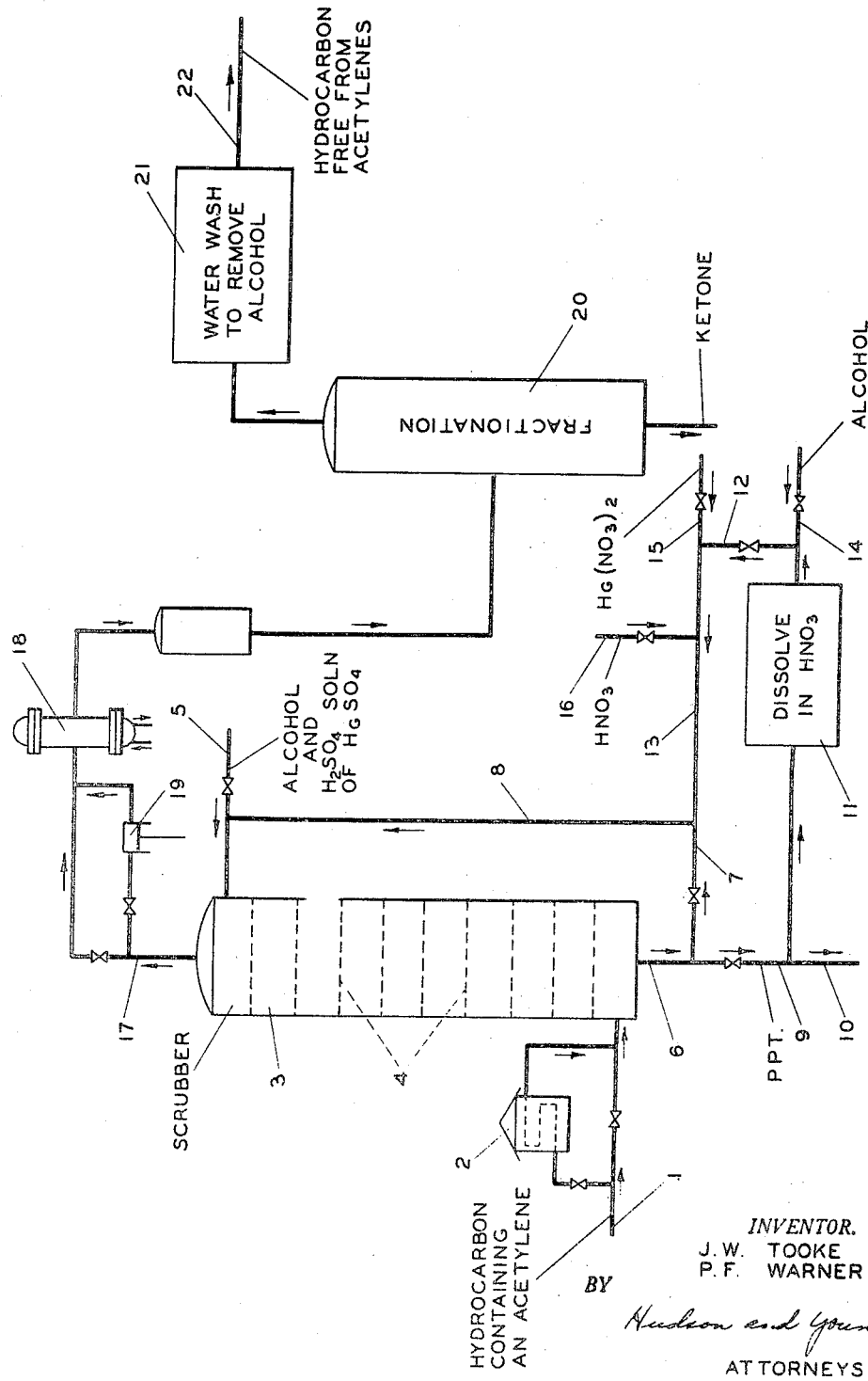

2,543,478

UNITED STATES PATENT OFFICE 2,543,478

PURIFICATION OF HYDROCARBONS

James W. Tooke, Bartlesville, Okla., and Paul F. Warner, Phillips, Tex., assignors to Phillips Petroleum Company, a corporation of Delaware Application May 7, 1946, Serial No. 667,790

11 Claims. (Cl. 202—57)

This invention relates to purification of hydrocarbons and more particularly to treatment of hydrocarbons contaminated with acetylene hydrocarbons to remove such acetylene hydrocarbons. More specifically it relates to a process of removing homologues of acetylene ($C_2H_2$) from aliphatic $C_3$ to $C_4$ hydrocarbons at least as saturated as a diolefin, i. e., either diolefins, olefins or paraffins. Still more specifically it relates to a process of removing a $C_4$ acetylene hydrocarbon impurity from butene-2 in order to make available to the art butene-2 of extreme purity suitable, for example, for the calibration of analytical and control instruments used in plant process operation especially in the aviation gasoline and synthetic rubber industries.

Contamination of hydrocarbons with homologues of acetylene is a very serious problem, especially in the manufacture of light hydrocarbons especially the aliphatic $C_3$ and $C_4$ paraffins, olefins and diolefins. These acetylene hydrocarbon impurities appear to be formed as the result of side reactions which accompany the production of olefins and diolefins by catalytic and thermal (non-catalytic) methods. The acetylene impurities boil in the same range as the $C_3$ and $C_4$ hydrocarbons with which they are associated, and by reason of their close-boiling point and/or tendency to form azeotropes with the $C_3$ and $C_4$ paraffins, olefins and diolefins, it is extremely difficult or impossible to separate them by conventional means such as fractional distillation, extractive distillation or the like. For example, the solvents which are selective for the olefin and/or diolefins appear to be even more selective for the acetylene hydrocarbons with which our invention is concerned.

Prior to our invention, it was impossible to produce butene-2 which was sufficiently free from acetylenes to enable its use for the calibration of instruments such as spectrophotometers used in the aviation gasoline and synthetic rubber industries. Our invention provides a simple, economical and certain method of producing butene-2 of this extreme purity.

The acetylene hydrocarbons dealt with in accordance with our invention are predominantly or exclusively the $C_3$ and $C_4$ acetylenes. Ordinarily in a $C_3$ stream a $C_3$ acetylene is encountered while in a $C_4$ stream the $C_4$ acetylenes are present.

The hydrocarbons which may be present in mixtures treated in accordance with our invention may be listed as follows, together with boiling point:

| Hydrocarbon | Normal Boiling Point, °F. |
|---|---|
| Propylene | −53.9 |
| Propane | −43.7 |
| Methyl Acetylene | −9.6 |
| Isobutane | +10.9 |
| Isobutylene | 19.6 |
| Butene-1 | 20.7 |
| Butadiene-1, 3 | 24.1 |
| N-Butane | 31.1 |
| Butene-2 (trans) | 33.6 |
| Butene-2 (cis) | 38.7 |
| Vinyl acetylene | 41.2 |
| Ethyl acetylene | 47.8 |
| Biacetylene | 49.6 |
| Dimethyl acetylene | 81.0 |

It was shown in Walls et al. 2,371,860 that methyl acetylene and propane form an azeotrope of the minimum-boiling type. The existence of an azeotrope between propylene and methyl acetylene is in doubt. It was shown in Buell 2,382,603 that minimum-boiling point azeotropes exist between vinyl acetylene and butenes-2 and between ethyl acetylene and butenes-2. It is also reliably reported that vinyl acetylene and ethyl acetylene form azeotropes with other $C_4$ hydrocarbons, particularly normal butane and isobutane. Resolution of such azeotropes by known procedures is very difficult or imposible.

Hydrocarbons containing an acetylenic linkage are very undesirable impurities in butadiene that is to be used as an intermediate for chemical synthesis or in rubber synthesis. Specifications for butadiene to be used in rubber manufacture are very strict with respect to actelyenes content. Separation of methyl acetylene from butadiene has been a serious problem. It has been proposed in the copending application of Hachmuth Serial No. 480,084, filed March 22, 1943, now U. S. Patent 2,434,923, issued January 27, 1948, and of Dean Serial No. 654,439, filed March 14, 1946, now U. S. Patent 2,486,929, issued November 1, 1949, to effect this separation in the same fractional distillation column wherein butadiene is separated from butenes-2. However this separation requires the use of an expensive fractionation column. Furthermore, the operation of such a column may become upset for various reasons, allowing production of a product which contains too much methyl acetylenes to pass specifications. Our invention provides an inexpensive and positive chemical method of effecting the separation of methyl acetylene from butadiene.

The presence of acetylenic impurities in light hydrocarbon streams fed to conversion processes such as alkylation, isomerization, polymerization, etc., is often highly undesirable and cannot be tolerated. For example, the normal butane fed to a process in which it is isomerized to isobutane with an aluminum chloride catalyst must be absolutely free from acetylenes. Similarly the isobutane and ethylene fed to a process for the manufacture of diisopropyl by alkylation using an aluminum chloride-hydrocarbon complex catalyst must be free from acetylenes.

The principal object of our invention is to provide an improved method of removing homologues of acetylene from hydrocarbons. Another object is to provide a simple, economical and positive method of removing such acetylene hydrocarbons from aliphatic $C_3$ to $C_4$ paraffins, olefins and diolefins. Another object is to provide an improved method of removing acetylene hydrocarbons from butene-2. Another object is to provide a method of making butene-2 of extreme purity suitable for calibration of analytical and control instruments, such as spectrophotometers, used in the processing of light hydrocarbon streams especially $C_3$ to $C_4$ hydrocarbons at least as saturated as a diolefin for the manufacture of aviation gasoline and synthetic rubber components. Numerous other objects will be apparent to those skilled in the art from the foregoing discussion and the following disclosure.

The accompanying drawing portrays diagrammatically one arrangement of equipment which is very suitable for the practice of our invention.

In accordance with our invention acetylene hydrocarbon impurity is removed from an aliphatic hydrocarbon contaminated therewith by intimately contacting said hydrocarbon with an aqueous acidic solution of a mercuric compound, said solution also containing a lower saturated aliphatic alcohol, under conditions such that the acetylene hydrocarbon impurity is converted to ketone by reaction with water, the acidic mercuric solution acting as a catalyst. The hydrocarbon is then separated from the ketone in any suitable manner.

The contacting of the hydrocarbon with the reagent solution is preferably conducted with the hydrocarbon in the gaseous phase in the manner known in the art as gas scrubbing. For example, the vaporized hydrocarbon feed is introduced into the bottom of a vertical gas-liquid contacting unit and allowed to ascend therein and simultaneously be intimately washed or scrubbed with the aqueous reagent solution. Means of any suitable type may be provided for increasing the intimacy of contact. For example, bubble trays, baffles, perforated trays, packing or the like may be provided within the scrubber. The scrubbing should be carried out in such manner that the desired degree of acetylene removal is accomplished during passage of the gas therethrough.

While we highly prefer gas-liquid contacting, we do not wish completely to exclude liquid-liquid contacting. Under some conditions it may be feasible to have the hydrocarbon in the liquid state during the contacting. However, it may be difficult to prevent reaction between non-acetylene hydrocarbons in the feed, such as olefins or diolefins and the reagent if the hydrocarbon feed is in liquid phase. As will appear more fully below, it is imperative that conditions of treatment are such that no such reaction takes place.

The temperature of the scrubbing operation should be such that, under the other conditions employed, principally pressure, reaction between the non-acetylenic components of the hydrocarbon feed and the reagent solution is substantially or completely prevented. This practically amounts to a requirement that elevated temperature be employed since at such temperatures the equilibrium between olefins or diolefins and mercuric salts is such that practically no reaction can occur. Furthermore we have found that the use of elevated temperatures prevents or retards formation of a precipitate in the scrubbing zone. As will appear more fully hereinafter, the formation of such a precipitate is highly undesirable because it represents a spending of the catalyst solution and requires the consumption of chemicals to counteract it.

The temperature at which the scrubbing is conducted may vary widely. Temperatures of at least 100° F. are ordinarily employed. In the purification of butene-2 in accordance with our invention we have found a temperature of from 140 to 160° F. to be preferable.

Ordinarily the scrubbing zone will be provided with any suitable means for maintaining the required elevated temperature. This may take the form of an electrical heating coil wound around the scrubbing zone where it is small or heating coils disposed within the scrubbing zone. In some cases enough heat to maintain the desired temperature may be supplied by suitably preheating the hydrocarbon feed and insulating the scrubbing zone to prevent loss of heat therefrom.

Any aqueous acidic solution of any mercury compound may be employed. However, we prefer to use mercuric sulfate in solution in sulfuric acid. The sulfuric acid is ordinarily quite dilute, ranging from 2 to 7 weight per cent of $H_2SO_4$ based on the total weight of the solution.

The concentration of mercuric ($Hg^{++}$) ion in the treating solution may vary within very wide limits. Ordinarily we prefer to use from 0.5 to 5 weight per cent of mercuric sulfate based on total weight of the solution. The minimum concentration of mercuric ion for satisfactory operation depends upon so many variable factors that it cannot be specified definitely; however, it is very low.

The gas issuing from the scrubbing operation comprises the hydrocarbon and the ketone. The hydrocarbon of greatly reduced acetylene content is separated from the ketone in any suitable manner, usually by simple fractional distillation. Usually this gaseous material leaving the scrubber contains some alcohol volatilized from the treating solution by reason of the elevated temperature. Apparently an azeotrope of the hydrocarbon and alcohol goes overhead in the distillation in some cases, at least. We prefer to remove such alcohol from the product hydrocarbon by washing the overhead fraction from the fractional distillation step with water. The resulting hydrocarbon may be dried if desired and constitutes the product of our invention.

An essential feature of our invention is the presence of substantial quantities of a lower saturated aliphatic alcohol, preferably one having not more than two carbon atoms per molecule, namely, methyl alcohol or ethyl alcohol, in the treating solution. The amount of such alcohol may vary within extremely wide limits but ordinarily will range from 7 to 20 weight per cent of the solution.

The alcohol markedly reduces the tendency of the treating solution to form precipitates. The alcohol also greatly reduces frothing and foaming of the scrubbing solution, apparently by reducing the surface tension. The most troublesome problem connected with the use of an acidic mercury solution to remove acetylene hydrocarbons is that of keeping the mercury salt catalyst in solution. Even when alcohol is used there is always some precipitate formed and it has been found to be a mixture of metallic mercury and mercury salts. It was found that the solution could be regenerated periodically by withdrawing the precipitate from the bottom of the scrubber or reactor, redissolving it in concentrated nitric acid and returning the resulting solution to the reactor. In lieu of this, fresh mercuric oxide dissolved in nitric acid can be added to regenerate the treating solution.

The alcohol, being the lower-boiling constituent of the solution, is gradually depleted at the elevated temperature of operation (usually 140 to 160° F.) so that it is also necessary to add alcohol at infrequent intervals.

Methanol is preferable to ethanol because it is readily available in commercial grade and seems to be the equivalent of or better than ethanol in every respect.

After the process was set up on pilot plant or plant scale, it was found possible to use the solution indefinitely by the use of alcohol and nitric acid as described above.

The amount of water in the treating solution will generally be at least 70 per cent by weight and may range upwardly therefrom to any desired figure.

It is often preferred to use ferric sulfate in substantial proportion in the treating solution. This functions principally as an indicator although it also appears to prevent the precipitation of mercury. When ferric sulfate is present, as long as the solution is yellow, it is known with certainty that the addition of nitric acid or of mercuric compound is unnecessary. When the solution turns green, indicating the presence of ferrous iron, the addition of nitric acid and of mercuric salt is necessary.

The pressure maintained in the scrubber may be varied over wide limits. Ordinarily the pressure is such that the hydrocarbon being treated is in the gaseous phase. It will be understood that the pressure should be such that the reaction of olefins or diolefins in the hydrocarbon with the mercuric salt is prevented. The pressure will ordinarily be only moderately in excess of superatmospheric, ranging say from just enough above atmospheric to force the hydrocarbon through the scrubbing zone to 100 pounds per square inch absolute.

The feed to the process of the present invention will usually contain acetylene hydrocarbons ($C_3$ and $C_4$ acetylenes) in amount ranging from 1 to 5 per cent by weight of the feed. By means of the invention, 99 per cent removal of the acetylenes is easily obtained. It is possible to secure such complete removal by the practice of our invention that the product hydrocarbon is suitable for the calibration of spectrophotometers where even the slightest trace of acetylenes would be objectionable. It is therefore clear that by sufficiently thorough or repeated application of the principles of our invention it is possible to completely free the hydrocarbon from any detectable amount of acetylene hydrocarbon impurities.

Pure low-boiling butene-2 prepared by means of our invention is being used as a standard for the calibration of the spectrometers used throughout this country as control instruments in the synthetic rubber and aviation gasoline industries.

In the drawing the hydrocarbon containing acetylenic hydrocarbon impurity enters the system via line 1. If it is in liquid form or if it is desired that additional heat be imparted to the gaseous hydrocarbon prior to entering the scrubbing step, it is passed through heater 2 where it is brought to any suitable elevated temperature as for example 140 to 160° F. It is then passed into scrubber 3 which is preferably a lagged vertical tower provided with plates 4 or any other suitable means for promoting intimate contact between gas and scrubbing liquid. Scrubbing liquid is introduced to the scrubber initially via line 5. If desired the scrubbing liquid may be withdrawn and recirculated continuously via lines 6, 7 and 8. Any precipitate reaching the bottom of the scrubber 3 may be withdrawn via line 9 and either discarded via line 10 or passed to step 11 wherein it is dissolved in concentrated $HNO_3$, the resulting solution being returned to the scrubber 3 via lines 12, 13 and 8. Alcohol may be added to the system via line 14 as needed to make up system losses. Mercuric nitrate may be added via line 15. Nitric acid may be added as necessary via line 16. If during operation it is desired to add fresh sulfuric acid solution of mercuric sulfate, this may be introduced via line 5. The gaseous mixture of the hydrocarbon and the ketone leaves scrubber 3 via line 17 and is liquefied by passage through condenser 18. If desired, compression by compressor 19 may also be employed to aid in effecting the liquefaction. The liquid mixture is then fed to fractional distillation column 20 which is operated at any suitable conditions of pressure and temperature and separates the feed into an overhead of the hydrocarbon and some alcohol and a bottoms product of the ketone. The overhead is preferably water-washed in unit 21 to give the pure hydrocarbon product which is withdrawn via line 22.

*Example I*

The removal of acetylene hydrocarbons from butene-2 by conversion to ketone was effected by passing the gas in fine dispersion through a heated solution (140–160° F.) of the following composition:

| Product | Parts by Weight |
| --- | --- |
| $HgSO_4$ | 1 |
| $H_2SO_4$ | 1-3 |
| $H_2O$ | 50 |
| Methanol | 10 |

$HNO_3$ and $Hg(NO_3)_2$ were added at infrequent intervals to regenerate the catalyst and keep $Hg^{++}$ concentration at the desired level. Ninety-nine plus per cent conversion was easily obtained when operating conditions were right. The reaction vessel was a 3″ x 6′ joint of "Pyrex" pipe with an external electrical heating coil wound on it. The volume of solution varied from 5000 to 6000 ml. in the reaction vessel. A pressure of 20 to 25 pounds per square inch gage was maintained. Flow rates varied from 1# to 2# per hour of butene depending on the percentage of acetylene present. The butene-2 was charged from one pressure cylinder through the reactor and collected in a receiver cylinder. The butene-2 was freed of ketone and methanol by subsequent fractionation.

The acetylene hydrocarbon impurity in the butene-2 was found by infra-red spectrophotometric analysis to be a four carbon atom acetylene and undoubtedly was ethyl acetylene. The ketone formed during the purification was identified by boiling point, specific gravity and refractive index as being methyl ethyl ketone.

*Example II*

This example reports typical runs with and without alcohol. The hydrocarbon being purified was butene-2 containing 5.19 weight per cent of acetylene which undoubtedly was ethyl acetylene. Two comparative runs were made. The butene-2 to be purified was bubbled in gaseous form upwardly through the solution which was disposed in a vertical reaction chamber. The precipitate which formed was periodically withdrawn from the bottom of the reactor, redissolved in concentrated nitric acid and returned to the reactor in order to regenerate the solution. The data for the two runs were as follows:

|  | Run I | Run II |
|---|---|---|
| Solution Composition: | | |
| $HgO$ _____grams__ | 25 | 25 |
| $Fe_2(SO_4)_3$ _____do___ | 25 | 25 |
| $H_2O$ _____ml__ | 1,900 | 1,900 |
| $H_2SO_4$ (66 Bé.) _____ml__ | 25 | 25 |
| $CH_3CH_2OH$ _____ml__ | 0.0 | 200 |
| Total liquid volume of hydrocarbon through before discarding_____ml__ | 160 | 1,100 |
| Acetylene in product at end of run__per cent_ | 0.43 | 0.20 |
| Average Acetylene in Product_____do____ | 0.23 | 0.05 |

Example II clearly illustrates the marked advantages of using methyl or ethyl alcohol in the catalytic solution.

From the foregoing detailed description a great many advantages of our invention will be apparent to those skilled in the art. The principal advantage of course is that the invention provides a simple and economical way of removing acetylenic hydrocarbons from aliphatic hydrocarbons contaminated therewith. The method is positive. The chemical consumption is low if the precipitate formed is redissolved and returned in the manner described. The method is easily carried out. The equipment requirements are low. If desired the ketone or ketones produced may be recovered and sold as a by-product. One of the most important advantages is that the invention solves a problem which had not heretofore been solved, namely the problem of complete removal of acetylene hydrocarbon impurities from research and calibration grade hydrocarbons such as the butylenes and especially butene-2.

We claim:

1. The method of effecting the removal of a $C_4$ acetylene hydrocarbon impurity from butene-2 which comprises passing said butene-2 as a vapor in fine dispersion through a catalyst solution of approximately the following composition in parts by weight: $HgSO_4$ 1, $H_2SO_4$ 1–3, water 50, methanol 10, maintaining said solution at a temperature of from 140 to 160° F., periodically adding $HNO_3$ and $Hg(NO_3)_2$ to regenerate the catalyst and keep the mercuric ion concentration at the desired level, thereby effecting conversion of said $C_4$ acetylene hydrocarbon to ketone, withdrawing a gaseous mixture of butene-2 and ketone from the zone of said conversion, and fractionally distilling said mixture of butene-2 and ketone to recover the butene-2 free of ketone.

2. The method of effecting the removal of a $C_4$ acetylene hydrocarbon impurity from butene-2 which comprises intimately contacting said butene-2 as a vapor with a solution having approximately the following composition in parts by weight:

| | |
|---|---|
| HgO | 25 |
| $Fe_2(SO_4)_3$ | 25 |
| Water | 1800 |
| $H_2SO_4$ | 43 |
| Ethyl alcohol | 158 | maintaining said solution at a temperature of approximately 150° F., thereby converting said $C_4$ acetylene hydrocarbon to a ketone, a precipitate of metallic mercury and mercury compounds forming during said contacting, regenerating said solution by withdrawing said precipitate from the contacting zone, dissolving said precipitate in concentrated nitric acid and returning the resulting solution to the contacting zone, adding ethyl alcohol as needed to replace that escaping in the off-gas, withdrawing a resulting gaseous mixture of butene-2, ketone and some ethyl alcohol from the contacting zone, fractionally distilling said mixture to separate it into an overhead fraction of butene-2 and ethyl alcohol and a bottoms fraction of said ketone, and water-washing said overhead to recover the butene-2 free of alcohol.

3. The process of purifying on a continuous basis a butene-2 stream containing acetylenic compounds as impurities in a proportion below 5 per cent by weight, which comprises passing such a butene-2 stream in the gaseous state to the lower portion of a contacting zone and contacting same therein in counter-current flow with an acidic aqueous solution of a mercuric salt containing free nitric acid and an aliphatic alcohol having not more than two carbon atoms in the molecule at a temperature in the range of 140 to 160° F. at a pressure of at least atmospheric, a precipitate of a mixture of metallic mercury and mercury compounds forming during said contacting, continuously withdrawing said precipitate from the contacting zone and dissolving same in nitric acid, admixing a resulting nitrate solution therefrom with a lower aliphatic alcohol having not more than two carbon atoms per molecule and passing the resulting admixture to said contacting zone, continuously withdrawing gaseous effluent from the upper portion of said contacting zone and passing same to a fractionation step, and recovering therefrom butene-2 substantially completely free of acetylenic impurities as a product.

4. The process of claim 3 wherein the contacting solution in said contacting zone contains on a weight basis at least 70 per cent water, 7 to 20 per cent methyl alcohol, 2 to 7 per cent sulfuric acid and from 0.5 to 5 per cent mercuric salt.

5. In a method for purification in vapor phase of butenes containing acetylenic hydrocarbon impurities having four carbon atoms per molecule and in a concentration below 5 per cent by weight, the improvement comprising continuously effecting a removal of such an impurity at a temperature above 100° F. and not higher than 160° F., by contacting such a butene in countercurrent flow with an aqueous acidic solution of a mercuric salt while simultaneously maintaining a constant concentration of mercuric ions in said aqueous solution by the continuous addition thereto of an admixture of nitric acid, mercuric nitrate, and a lower aliphatic saturated alcohol having not more than two carbon atoms per molecule in such an amount as to maintain said aqueous solution.

6. In a method for purification of butenes containing acetylenic hydrocarbon impurities having four carbon atoms per molecule and in a concentration below 5 per cent by weight, the improvement comprising continuously effecting a removal of such an impurity at a temperature above 100° F. and not higher than 160° F., at a pressure of at least one atmosphere, by contacting such a butene in countercurrent flow with a dilute aqueous acidic solution of from 0.5 to 5 per cent mercuric sulfate, mercuric nitrate, 2 to 7 per cent sulfuric acid, nitric acid and from 7 to 20 per cent of an aliphatic alcohol containing not more than two carbon atoms in the molecule while simultaneously maintaining a constant concentration of mercuric ions in said aqueous solution by the continuous withdrawal of aqueous solution from the zone of said contacting and the continuous addition thereto of an admixture of a lower aliphatic saturated alcohol having not more than two carbon atoms per molecule and mercuric oxide dissolved in nitric acid, and adding said admixture in an amount as to maintain the concentration of mercuric ions in said aqueous solution.

7. The method of claim 5 wherein said alcohol is methanol.

8. The process of purifying a predominantly $C_3$–$C_4$ aliphatic hydrocarbon mixture containing acetylenic impurities, which comprises contacting such a hydrocarbon stream in a contacting zone in countercurrent flow with an acidic aqueous solution of a mercuric salt at a temperature in the range of 140 to 160° F. at a pressure of at least atmospheric, a precipitate of a mixture of metallic mercury and mercury compounds forming during said contacting, continuously withdrawing said precipitate from the contacting zone and dissolving same in nitric acid, admixing a resulting nitrate solution therefrom with a lower aliphatic alcohol having not more than 2 carbon atoms per molecule and passing the resulting mixture to said contacting zone, continuously withdrawing gaseous effluent from the upper portion of said contacting zone and passing same to a fractionation step, and recovering therefrom as a product of the process a $C_3$–$C_4$ aliphatic hydrocarbon mixture substantially free of acetylenic impurities.

9. The process for purifying a normally gaseous aliphatic hydrocarbon mixture containing acetylenic impurities, which comprises contacting such a hydrocarbon stream in a contacting zone in countercurrent flow with an acidic aqueous solution of a mercuric salt containing free nitric acid and from 7 to 20 per cent of an alcohol having not more than two carbon atoms in the molecule at a temperature in the range of 140 to 160° F. at a pressure of at least one atmosphere, a precipitate of a mixture of metallic mercury and mercury compounds forming during said contacting, continuously withdrawing said precipitate from the contacting zone and dissolving same in nitric acid, admixing a resulting nitrate solution therefrom with a lower aliphatic alcohol having not more than 2 carbon atoms per molecule and passing the resulting mixture to said contacting zone, continuously withdrawing gaseous effluent from the upper portion of said contacting zone and recovering from the withdrawn effluent as a product of the process a normally gaseous aliphatic hydrocarbon mixture substantially free of acetylenic impurities.

10. In a process wherein a butene-2 stream containing acetylenic compounds as impurities in a proportion below 5 per cent by weight is purified by passing same in the gaseous state in countercurrent flow relation with an acidic aqueous solution of a mercuric salt at a temperature within the limits of 140 to 160° F. at substantially atmospheric pressure, and wherein a precipitate of a mixture of metallic mercury and mercury compounds forms during said countercurrent flow, the improvement comprising withdrawing said precipitate and dissolving same in nitric acid, admixing a resulting nitrate solution with an aliphatic alcohol having not more than two carbon atoms per molecule, and passing the resulting admixture to the zone of said countercurrent contacting, whereby the concentration of mercury ions in said zone of countercurrent contacting is maintained at a constant level.

11. In a process for the purification of butenes containing acetylenic hydrocarbon impurities in a concentration below 5 per cent by weight wherein such a butene stream is passed in the gaseous state in countercurrent flow relation with a dilute aqueous acidic solution containing from 0.5 to 5 weight per cent mercuric sulfate and from 2 to 7 per cent by weight of sulfuric acid, at substantially atmospheric pressure and at a temperature within the limits of 140 to 160° F., and wherein a precipitate of a mixture of metallic mercury and mercury compounds forms during said countercurrent flow, the improvement comprising the dissolving of mercuric oxide in nitric acid and introducing the resulting nitrate solution together with an aliphatic alcohol containing not more than two carbon atoms in the molecule into said zone of countercurrent contacting in an amount such as to maintain the concentration of mercuric ions in said aqueous solution.

JAMES W. TOOKE.
PAUL F. WARNER.

REFERENCES CITED

The following references are of record in the file of this patent:

UNITED STATES PATENTS

| Number | Name | Date |
|---|---|---|
| 1,816,326 | Hermann et al. | July 28, 1931 |
| 1,967,225 | Conaway | July 24, 1934 |
| 2,062,263 | Eberhardt | Nov. 24, 1936 |
| 2,408,970 | Doumani et al. | Oct. 8, 1946 |

FOREIGN PATENTS

| Number | Country | Date |
|---|---|---|
| 115,765 | Australia | Sept. 3, 1942 |